US012548912B2

(12) United States Patent
Inafune et al.

(10) Patent No.: US 12,548,912 B2
(45) Date of Patent: Feb. 10, 2026

(54) METAL PLATE ANTENNA AND ANTENNA DEVICE

(71) Applicant: KABUSHIKI KAISHA TOKAI RIKA DENKI SEISAKUSHO, Aichi (JP)

(72) Inventors: Koji Inafune, Aichi (JP); Kenichi Koga, Aichi (JP); Tatsuya Koike, Aichi (JP); Satoshi Mori, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 348 days.

(21) Appl. No.: 18/203,766

(22) Filed: May 31, 2023

(65) Prior Publication Data

US 2024/0006773 A1 Jan. 4, 2024

(30) Foreign Application Priority Data

Jul. 1, 2022 (JP) ................................ 2022-107295
Oct. 5, 2022 (JP) ................................ 2022-160863
Jan. 30, 2023 (JP) ................................ 2023-011971

(51) Int. Cl.
*H01Q 9/00* (2006.01)
*H01Q 1/48* (2006.01)
(Continued)

(52) U.S. Cl.
CPC ................ *H01Q 9/42* (2013.01); *H01Q 1/48* (2013.01); *H04B 1/44* (2013.01)

(58) Field of Classification Search
CPC .. H01Q 9/42; H01Q 1/48; H01Q 5/25; H01Q 9/0421; H01Q 7/00; H04B 1/44; H04B 1/1036
See application file for complete search history.

(56) References Cited

U.S. PATENT DOCUMENTS 4,907,006 A 3/1990 Nishikawa et al.
6,590,541 B1 7/2003 Schultze
(Continued)

FOREIGN PATENT DOCUMENTS

DE 10045634 4/2002
WO 2016/139403 9/2016

OTHER PUBLICATIONS

Satoshi Honda et al., "A Disk Monopole Antenna with 1:8 Impedance Bandwidth and Omnidirectional Radiation Pattern", Proceedings of ISAP '92, Sapporo, Japan, Sep. 25, 1992, pp. 1145-1148.
(Continued)

*Primary Examiner* — Md K Talukder
(74) *Attorney, Agent, or Firm* — Greenblum & Bernstein, P.L.C.

(57) ABSTRACT

There is provided a metal plate antenna that has an arch shape and transmits and receives a radio signal based on a specified communication standard, comprising: a feeding point contact portion configured to come into contact with a feeding point formed on a substrate at one end of the arch shape; and a GND contact portion configured to come into contact with a GND formed on the substrate at the other end of the arch shape, wherein an antenna length defined by a length between the feeding point contact portion and the GND contact portion is formed to be approximately ½ of a wavelength of the radio signal based on the specified communication standard.

16 Claims, 20 Drawing Sheets

(51) Int. Cl.
*H01Q 9/42* (2006.01)
*H04B 1/44* (2006.01)

(56) References Cited

U.S. PATENT DOCUMENTS

| | | | | |
|---|---|---|---|---|
| 9,461,356 | B2 | 10/2016 | Yurugi et al. | |
| 2009/0231213 | A1* | 9/2009 | Ishimiya | H01Q 21/30 343/702 |
| 2013/0162488 | A1* | 6/2013 | Onaka | H01Q 1/38 343/728 |
| 2017/0063412 | A1* | 3/2017 | Ripley | H04B 1/18 |
| 2019/0363440 | A1* | 11/2019 | Samardzija | H01Q 1/2291 |
| 2020/0144721 | A1* | 5/2020 | Ndip | H01Q 7/00 |
| 2022/0149510 | A1* | 5/2022 | Hashiguchi | H01Q 9/42 |
| 2024/0006773 | A1* | 1/2024 | Inafune | H01Q 9/0421 |
| 2024/0079757 | A1* | 3/2024 | Amjadi | H01Q 1/243 |

OTHER PUBLICATIONS

Johnson Gary Lee, "The Scimitar Antenna", Master's Thesis, Dec. 31, 1963 (Dec. 31, 1963), pp. 1-46, XP093095645, Manhattan, Kansas, USA, Retrieved from the Internet: URL: https://core.ac.uk/download/pdf/33368286.pdf.

* cited by examiner

110A

〈VARIATIONS OF SHAPE OF FEEDING SIDE SURFACE〉

110A

METAL PLATE ANTENNA AND ANTENNA DEVICE

CROSS REFERENCE TO RELATED APPLICATION(S)

This application is based upon and claims benefit of priority from Japanese Patent Application No. 2022-107295, filed on Jul. 1, 2022, Japanese Patent Application No. 2022-160863, filed on Oct. 5, 2022, and Japanese Patent Application No. 2023-011971, filed on Jan. 30, 2023, the entire contents of which are incorporated herein by reference.

BACKGROUND

The present invention relates to a metal plate antenna and an antenna device.

In recent years, a wide variety of antennas have been developed. For example, Non-Patent Document 1 discloses a disk monopole antenna disposed on a substrate.

[Non-Patent Document 1] Satoshi Honda, three others, "A DISK MONOPOLE ANTENNA WITH 1:8 IMPEDANCE BANDWIDTH AND OMNIDIRECTIONAL RADIATION PATTERN," [online], Sep. 25, 1992, PROCEEDINGS OF ISAP '92, SAPPORO, JAPAN, [accessed Jan. 30, 2023], Internet <https://citeseerx.ist.psu.edu/pdf/ca777261654e94c97cf6965fb24f6c4a52a109a2>

SUMMARY

The disk monopole antenna disclosed in Non-Patent Document 1 lacks stability because it has a structure that stands vertically on a substrate with a single support point. In a case in which the antenna has such a structure, there is a possibility that the antenna may fall down or the like due to an impact or the like during the manufacturing process or after the product has been shipped and may not function.

Thus, an object of the present invention is to provide an antenna that can be stably disposed on a substrate.

To solve the above described problem, according to an aspect of the present invention, there is provided a metal plate antenna that has an arch shape and transmits and receives a radio signal based on a specified communication standard, comprising: a feeding point contact portion configured to come into contact with a feeding point formed on a substrate at one end of the arch shape; and a GND contact portion configured to come into contact with a GND formed on the substrate at the other end of the arch shape, wherein an antenna length defined by a length between the feeding point contact portion and the GND contact portion is formed to be approximately ½ of a wavelength of the radio signal based on the specified communication standard.

To solve the above described problem, according to another aspect of the present invention, there is provided an antenna device comprising: a substrate; a feeding point formed on the substrate; a GND formed on the substrate; a high frequency IC disposed on the substrate; a notch filter formed on the substrate and attenuating a signal in a specified frequency band; and a metal plate antenna that has an arch shape, is disposed on the substrate, and transmits and receives a radio signal based on a specified communication standard, wherein connection and disconnection between a transmission line connecting the high frequency IC to the feeding point and the notch filter is switchable by an element, the metal plate antenna includes: a feeding point contact portion configured to come into contact with a feeding point formed on the substrate at one end of the arch shape; and a GND contact portion configured to come into contact with the GND formed on the substrate at the other end of the arch shape, and an antenna length defined by a length between the feeding point contact portion and the GND contact portion is formed to be approximately ½ of a wavelength of the radio signal based on the specified communication standard.

To solve the above described problem, according to another aspect of the present invention, there is provided an antenna device comprising: a substrate; a feeding point formed on the substrate; a GND formed on the substrate; and a metal plate antenna that has an arch shape, is disposed on the substrate, and transmits and receives a radio signal based on a specified communication standard, wherein the metal plate antenna includes: a feeding point contact portion configured to come into contact with a feeding point formed on the substrate at one end of the arch shape; and a GND contact portion configured to come into contact with the GND formed on the substrate at the other end of the arch shape, an antenna length thereof defined by a length between the feeding point contact portion and the GND contact portion is formed to be approximately ½ of a wavelength of the radio signal based on the specified communication standard, and the metal plate antenna is disposed at a position on the substrate in accordance with a received polarized wave.

As described above, according to the present invention, it is possible to provide an antenna that can be stably disposed on a substrate.

DETAILED DESCRIPTION OF THE EMBODIMENT(S)

Figure 1:
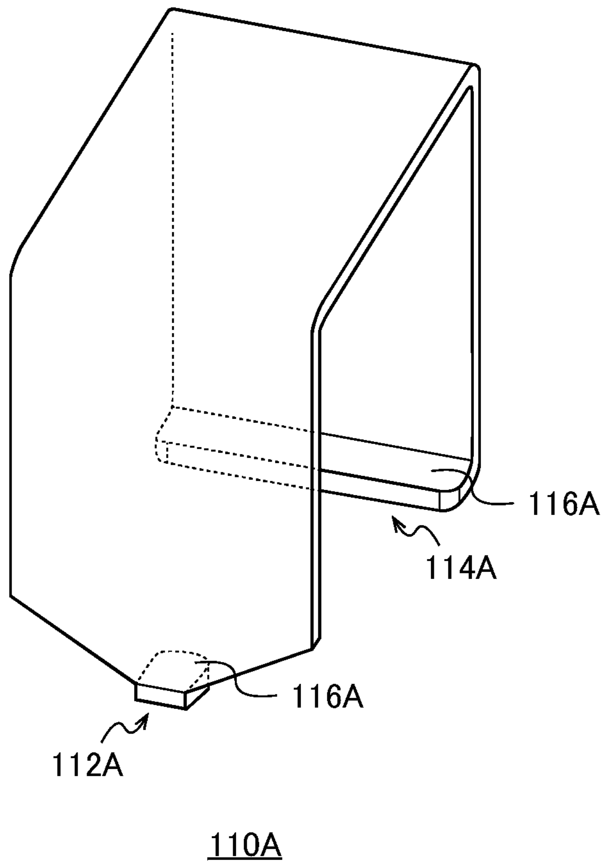
FIG. 1 is a diagram showing a shape example in a case in which both a feeding point contact portion 112 and a GND contact portion 114 of a metal plate antenna 110 according to the present embodiment have bent portions 116.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

In addition, in this specification and the appended drawings, letters may be added to ends of reference numerals when a plurality of configurations of the same type are described separately. On the other hand, in a case in which there is no need to distinguish the plurality of configurations of the same type from each other, the letters may be omitted and a description that commonly applies to all of the plurality of configurations of the same type may be given.

<1. Embodiment>

<<1.1. Shape of Metal Plate Antenna>>

First, a metal plate antenna 110 provided in an antenna device 10 (see FIG. 5) according to one embodiment of the present invention will be described.

The metal plate antenna 110 according to the present embodiment transmits and receives a radio signal based on a specified communication standard.

Examples of the specified communication standard according to the present embodiment include, for example, ultra-wide band (UWB) wireless communication.

On the other hand, the specified communication standard according to the present embodiment is not limited to the above example. Any communication standard may be adopted as the specified communication standard according to the present embodiment.

Also, the metal plate antenna 110 according to the present embodiment is conceived by focusing on stable placement on the substrate 150 (see FIG. 5) and has a characteristic shape that will be described below.

The metal plate antenna 110 according to the present embodiment is made of, for example, one metal plate and is formed to have an arch shape in at least a portion thereof.

In addition, the metal plate antenna 110 according to the present embodiment has a feeding point contact portion 112 (FIGS. 1 to 3 and 5) that comes into contact with a feeding point 120 (see FIG. 5) formed on the substrate 150 at one end of the arch shape.

Further, the metal plate antenna 110 according to the present embodiment includes a GND contact portion 114 (see FIGS. 1 to 5) that comes into contact with a GND 130 (see FIG. 5) formed on the substrate 150 at another end (the other end) of the arch shape different from the one end.

That is, the metal plate antenna 110 according to the present embodiment is supported by the feeding point contact portion 112 and the GND contact portion 114 on the substrate 150.

According to the above configuration, the metal plate antenna 110 can be disposed more stably on the substrate 150 as compared with a case in which an antenna is supported by a single support point.

Also, the feeding point contact portion 112 and the GND contact portion 114 may be fixed to the substrate 150 with a conductive adhesive such as solder in order to further improve stability. However, some GND contact portions 114 do not need to be fixed with a conductive adhesive as will be described later.

Further, an antenna length defined by a length between the feeding point contact portion 112 and the GND contact portion 114 according to the present embodiment is formed to be approximately ½ of a wavelength λ of the radio signal based on the specified communication standard.

In a case in which the antenna length is formed as above, the metal plate antenna 110 operates as a one-wavelength (λ) loop antenna due to a mirror image formed with the GND 130 as a mirror surface.

Next, a shape of the feeding point contact portion 112 and a shape of the GND contact portion 114 according to the present embodiment will be described in detail.

At least one of the feeding point contact portion 112 and the GND contact portion 114 according to the present embodiment may have a bent portion 116 formed by bending an end portion of the arch shape.

FIG. 1 is a diagram showing a shape example in a case in which both the feeding point contact portion 112 and the GND contact portion 114 of the metal plate antenna 110 according to the present embodiment have the bent portions 116.

In the case of the example shown in FIG. 1, the arch shape of a metal plate antenna 110A is formed in a U shape.

A feeding point contact portion 112A having a bent portion 116A formed by bending one end of the arch shape of the metal plate antenna 110A is provided at the one end.

Similarly, a GND contact portion 114A having a bent portion 116A formed by bending the other end of the arch shape of the metal plate antenna 110A is provided at the other end.

Since the feeding point contact portion 112A and the GND contact portion 114A have the bent portions 116A, their contact areas with the feeding point 120 and the GND 130 are increased, and stability of the metal plate antenna 110A on the substrate 150 is further improved.

In addition, since the bent portion 116A has a large contact area with the feeding point 120 or the GND 130, there is an advantage that a fillet is easily formed in fixing with a conductive adhesive such as solder, and the formed fillet is easily confirmed.

Also, since the bent portion 116A has a large contact area with the feeding point 120 or the GND 130, wiring is easily drawn out.

On the other hand, at least one of the feeding point contact portion 112 and the GND contact portion 114 according to the present embodiment may have at least one pin portion 118 that is inserted into a through hole 155 (see FIG. 5) formed in the substrate 150.

Figure 2:
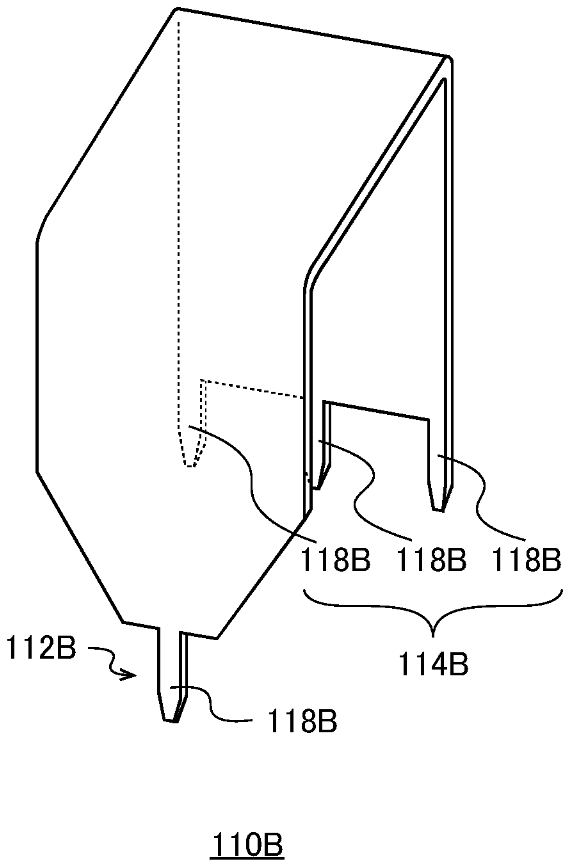
FIG. 2 is a diagram showing a shape example in a case in which both the feeding point contact portion 112 and the GND contact portion 114 of the metal plate antenna 110 according to the same embodiment have pin portions 118.

FIG. 2 is a diagram showing a shape example in which both the feeding point contact portion 112 and the GND contact portion 114 of the metal plate antenna 110 according to the present embodiment have the pin portions 118.

In the case of the example shown in FIG. 2, a feeding point contact portion 112B having one pin portion 118B inserted into the through hole 155 formed in the substrate 150 is provided at one end of an arch shape of a metal plate antenna 110B.

A GND contact portion 114B having three pin portions 118B inserted into the through holes 155 formed in the substrate 150 is provided at the other end of the arch shape of the metal plate antenna 110B.

Since each of the feeding point contact portion 112B and the GND contact portion 114B has one or more pin portions 118B, the metal plate antenna 110B is more firmly fixed to the substrate 150, and it is possible to reduce a possibility of the metal plate antenna 110B falling down or being displaced, for example, in a reflow process or the like as well.

In addition, the pin portion 118B of the feeding point contact portion 112B is fixed to the substrate 150 with a conductive adhesive.

Further, at least one of the pin portions 118B of the GND contact portion 114B is fixed to the substrate 150 with a conductive adhesive. For example, as shown in FIG. 2, in a case in which the GND contact portion 114B has three pin portions 118B, only one pin portion 118B may be fixed to the substrate 150 with a conductive adhesive, and the remaining two pin portions 118B may not be fixed in the same manner.

The shape example in which both the feeding point contact portion 112 and the GND contact portion 114 of the metal plate antenna 110 have the pin portions 118 has been described above. On the other hand, the feeding point contact portion 112 according to the present embodiment may have a bent portion 116 and the GND contact portion 114 may have a bent portion 116 and one or more pin portions 118.

Figure 3:
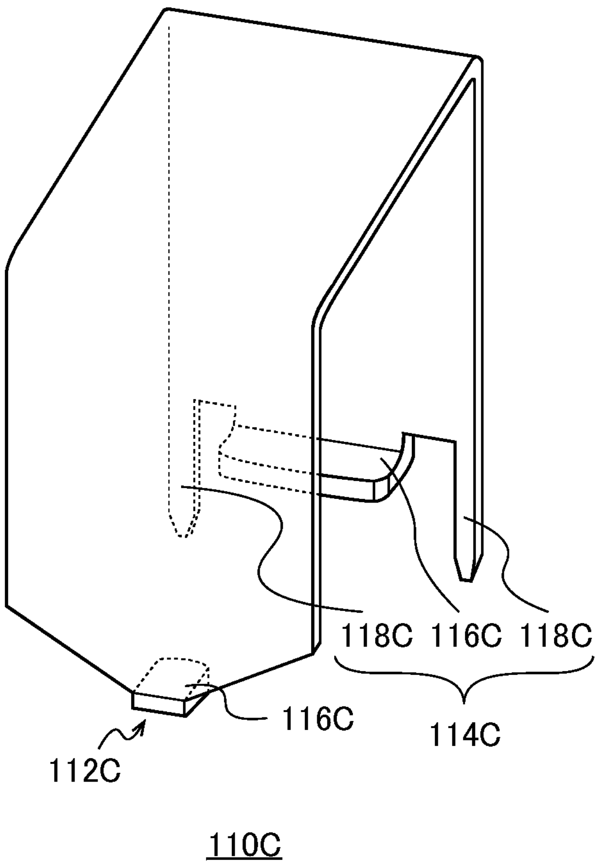
FIG. 3 is a diagram showing a shape example in a case in which the feeding point contact portion 112 of the metal plate antenna 110 according to the same embodiment has the bent portion 116, and the GND contact portion 114 has the bent portion 116 and the pin portions 118.

FIG. 3 is a diagram showing a shape example in which the feeding point contact portion 112 of the metal plate antenna 110 according to the present embodiment has the bent portion 116 and the GND contact portion 114 has the bent portion 116 and the pin portions 118.

In the case of the example shown in FIG. 3, a feeding point contact portion 112C having a bent portion 116C formed by bending one end of an arch shape of a metal plate antenna 110C is provided at the one end.

Also, a GND contact portion 114C having a bent portion 116C formed by 15 bending the other end of the arch shape of the metal plate antenna 110C and two pin portions 118C inserted into the through holes 155 formed in the substrate 150 is provided at the other end.

As shown in FIG. 3, in a case in which the metal plate antenna 110C has both the bent portion 116C and the pin portions 118C at end portions of the arch shape, it is possible to enjoy both the effect of the bent portion 116 and the effect of the pin portion 118 described above.

Further, in the case of the metal plate antenna 110C shown in FIG. 3, the bent portion 116C of the feeding point contact portion 112C and the bent portion 116C of the GND contact portion 114C are fixed to the substrate 150 with a conductive adhesive.

On the other hand, the two pin portions 118C of the GND contact portion 114C do not need to be fixed to the substrate 150 with a conductive adhesive.

Figure 4:
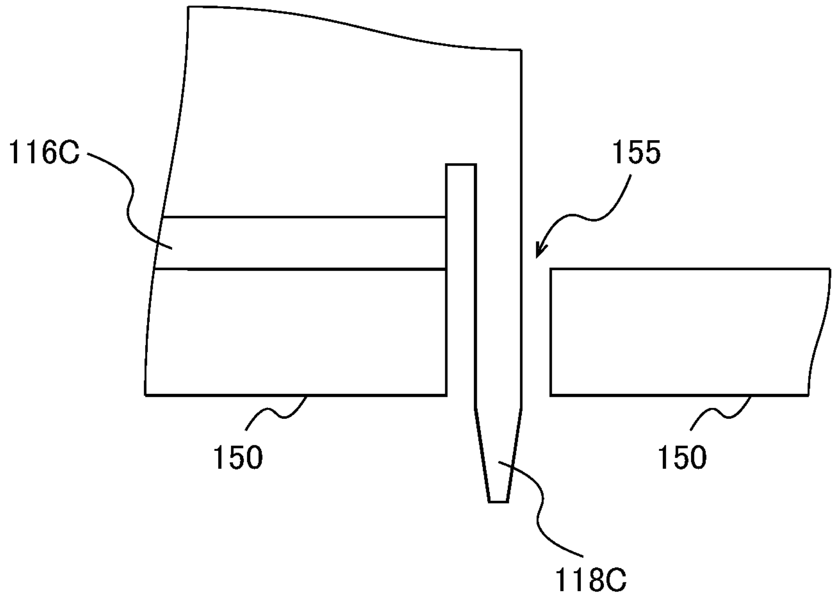
FIG. 4 is a diagram for explaining the GND contact portion 114C included in the metal plate antenna 110.

FIG. 4 is a diagram for explaining the GND contact portion 114C included in the metal plate antenna 110C according to the present embodiment. FIG. 4 shows a positional relationship between the bent portion 116C and the pin portion 118C of the GND contact portion 114C and the substrate 150. Also, in FIG. 4, partial regions of the metal plate antenna 110C and the substrate 150 are shown enlarged, and illustration of other regions is omitted.

Figure 5:
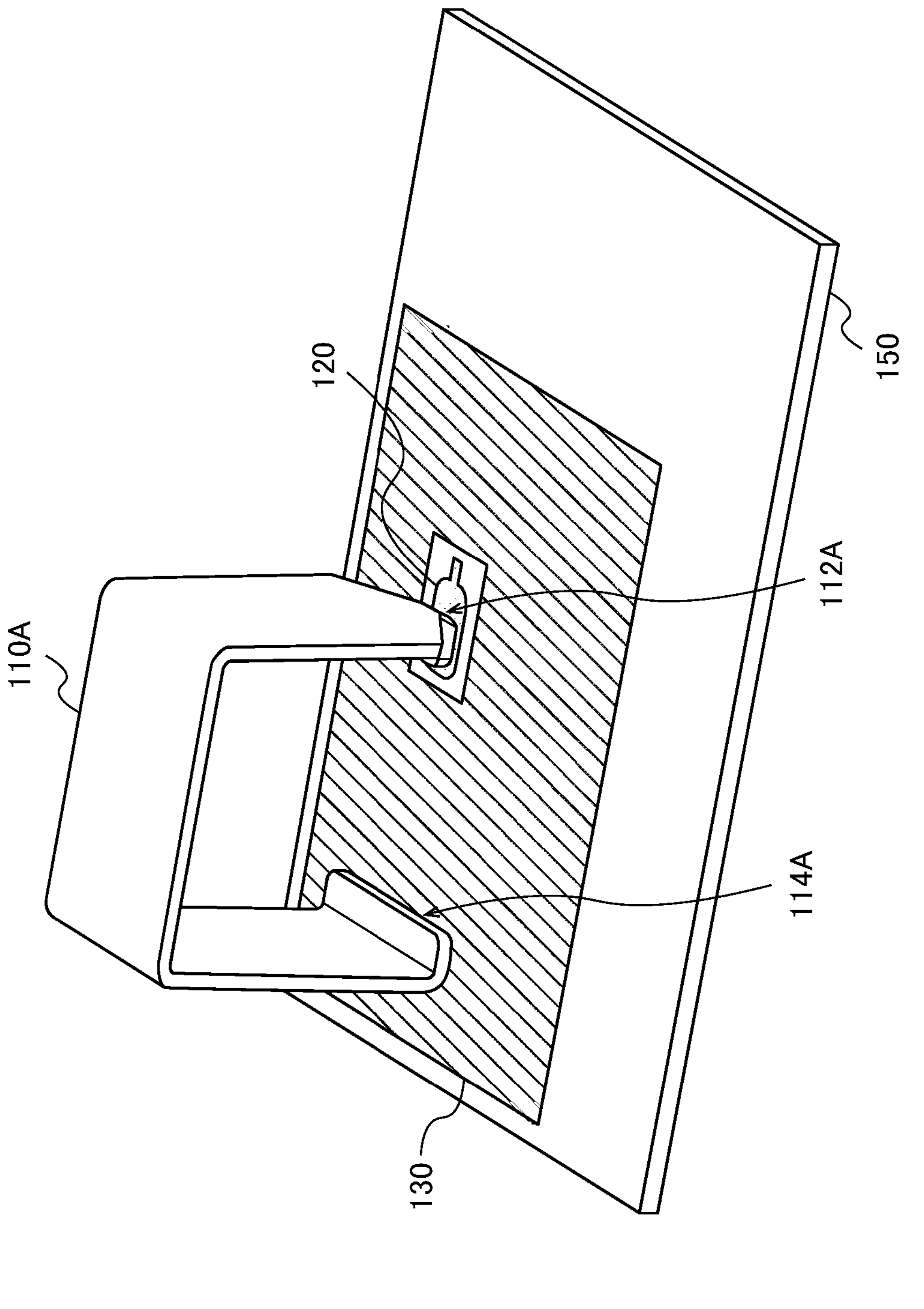
FIG. 5 is a diagram for explaining a positional relationship among the metal plate antenna 110, a feeding point 120, a GND 130, and a substrate 150 according to the same embodiment.

As shown in FIG. 4, the bent portion 116C of the GND contact portion 114C comes into contact with an upper surface of the substrate 150. Also, the bent portion 116C of the GND contact portion 114C is fixed to the substrate 150 with a conductive adhesive. In addition, as shown in FIG. 5, the GND 130 is formed in a region in contact with the GND contact portion 114 on the upper surface of the substrate 150.

On the other hand, as shown in FIG. 4, the pin portion 118C of the GND contact portion 114C is inserted into the through hole 155 formed in the substrate 150, but may not come into contact with the substrate 150.

In addition, the pin portion 118C of the GND contact portion 114C may be formed such that a portion protruding from a lower surface of the substrate 150 tapers toward its tip.

Further, one of features of the pin portion 118C of the GND contact portion 114C is that it is not fixed to the substrate 150 with a conductive adhesive.

Since the pin portion 118C is inserted into the through hole 155 formed in the substrate 150, it is possible to prevent occurrence of a positional deviation between the substrate 150 and the metal plate antenna 110C during the manufacturing process and prevent the metal plate antenna 110C from being unable to stand on its own on the substrate 150 and falling down.

In addition, since the pin portion 118C is not fixed to the substrate 150 with a conductive adhesive, it is possible to prevent various defects (for example, soldering defects) that may occur with the fixing process using the conductive adhesive.

The shape of the metal plate antenna 110 according to the present embodiment has been described above with specific examples.

However, the shapes described with reference to FIGS. 1 to 4 are merely examples, and the shape of the metal plate antenna 110 according to the present embodiment is not limited to such examples.

For example, the number of the pin portions 118 formed on the metal plate antenna 110 is not limited to the examples shown in FIGS. 2 and 3.

Also, for example, areas of the bent portions 116 formed in the metal plate antenna 110 are not limited to the examples shown in FIGS. 1 and 3.

In addition, for example, the bent portions 116 formed in the metal plate antenna 110 may be bent toward the outside of the arch shape, unlike the examples shown in FIGS. 1 and 3.

The shape of the metal plate antenna 110 according to the present embodiment can be flexibly deformed depending on a size, a material, or the like of the metal plate antenna 110.

<<1.2. Configuration of Antenna Device 10>>

Next, a configuration example of the antenna device 10 according to the present embodiment will be described.

As described above, the antenna device 10 according to the present embodiment includes the substrate 150, the metal plate antenna 110 disposed on the substrate 150, and the feeding point 120 and the GND 130 formed on the substrate 150.

FIG. 5 is a diagram for explaining a positional relationship among the metal plate antenna 110, the feeding point 120, the GND 130, and the substrate 150 according to the present embodiment.

As shown in FIG. 5, the feeding point 120 and the GND 130 are formed on the upper surface of the substrate 150.

The GND 130 may be, for example, a solid GND or the like. Also, arrangement and an area of the GND shown in FIG. 5 are merely examples.

Further, the metal plate antenna 110 is disposed on the upper surface of the substrate 150 so that the feeding point contact portion 112 comes into contact with the feeding point 120 and the GND contact portion 114 comes into contact with the GND 130.

Also, FIG. 5 shows an example in a case in which the antenna device 10 includes the metal plate antenna 110A shown in FIG. 1.

Next, another configuration included in the antenna device 10 according to the present embodiment will be described.

The antenna device 10 according to the present embodiment further includes a high frequency IC 160 (see FIG. 6) connected to the feeding point 120 via a transmission line, and a notch filter that attenuates a signal in a specified frequency band.

Also, connection and disconnection between the transmission line connecting the high frequency IC 160 to the feeding point 120 and the notch filter may be switchable by an element 180.

Figure 6:
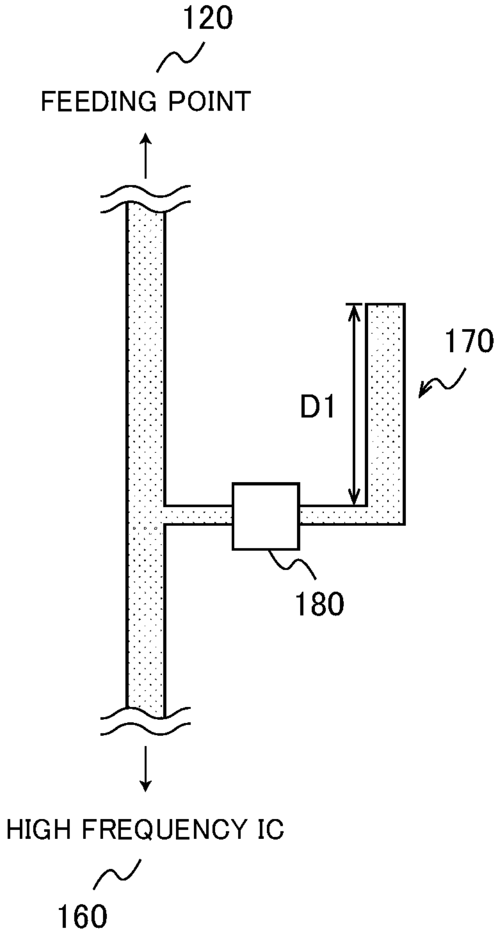
FIG. 6 is a diagram for explaining an arrangement relationship among the feeding point 120, a high frequency IC 160, a notch filter, and an element 180 according to the same embodiment.

FIG. 6 is a diagram for explaining an arrangement relationship among the feeding point 120, the high frequency IC 160, the notch filter, and the element 180 according to the present embodiment.

Also, FIG. 6 shows an example in a case in which the notch filter is a stub 170.

A length D1 of the stub 170 is designed in accordance with a frequency serving as an attenuation target.

For example, it is assumed that the specified communication standard is ultra-wideband wireless communication. In the ultra-wideband wireless communication, a plurality of channels are specified, but available channels may be restricted depending on a country or a region.

For example, if CH5 and CH9 are available in country X, but only CH9 is available in country Y, the antenna device 10 used in country Y is required not to transmit or receive a signal on CH5.

In view of the circumstances as described above, the antenna device 10 according to the present embodiment may be capable of changing a frequency band of the radio signal to be transmitted and received during the manufacturing process or after manufacturing.

For example, in the case of the example given above, the length D1 of the stub 170 is formed with a length that attenuates the signal in the frequency band corresponding to CH5.

Also, connection and disconnection between the transmission line connecting the high frequency IC 160 to the feeding point 120 and the stub 170 may be switchable by, for example, presence or absence of a chip element. Further, the chip element is an example of the element 180.

In a case in which the antenna device 10 includes the chip element, the chip element connects the transmission line, which connects the high frequency IC 160 to the feeding point 120, to the stub 170, and the stub 170 attenuates the signal in the frequency band corresponding to CH5, thereby making CH5 unusable.

On the other hand, in a case in which the antenna device 10 does not have the chip element, a state in which the transmission line connecting the high frequency IC 160 to the feeding point 120 is not connected to the stub 170 is maintained, and attenuation of the signal in the frequency band corresponding to CH5 is not performed by the stub 170, and thus both CH5 and CH9 can be used.

In this way, the antenna device 10 according to the present embodiment can easily change the available channels by performing switching between presence and absence of the chip element in the manufacturing process.

On the other hand, the element 180 according to the present embodiment may be a switching element.

In this case, it is possible to change the available channels by performing switching between connection and disconnection between the transmission line connecting the high frequency IC 160 and the feeding point 120 and the stub 170 using the switching element.

Also, in this case, it is possible to switch the available channels even after the product is shipped, thereby increasing versatility.

As described above, one of features of the antenna device 10 according to the present embodiment is that it changes the usable frequency band by performing switching between connection and disconnection between the transmission line connecting the high frequency IC 160 to the feeding point 120 and the stub 170 using the element 180.

According to the above feature, it is possible to easily respond to changes in destinations, or the like, and to significantly reduce costs. Also, the case in which each of the number of notch filters and the number of elements 180 is one has been exemplified in the above, but the number of notch filters and the number of elements 180 are not limited to these examples.

The number of notch filters and the number of elements 180 may be designed in accordance with the number of frequency bands to be restricted.

On the other hand, the antenna device 10 according to the present embodiment may not necessarily be designed to support a plurality of channels such as CH5 and CH9.

For example, the antenna length of the metal plate antenna 110 may be designed to match a 0.5λ resonance mode with the CH9 band, or the antenna length may be designed to match a 0.25λ resonance mode with the CH9 band. <<<1.3. Arrangement of Metal Plate Antenna 10>>

Next, arrangement of the metal plate antenna 110 according to the present embodiment will be described in more detail.

The metal plate antenna 110 according to the present embodiment may be disposed at a position on the substrate corresponding to a polarized wave to be received.

Figure 7:
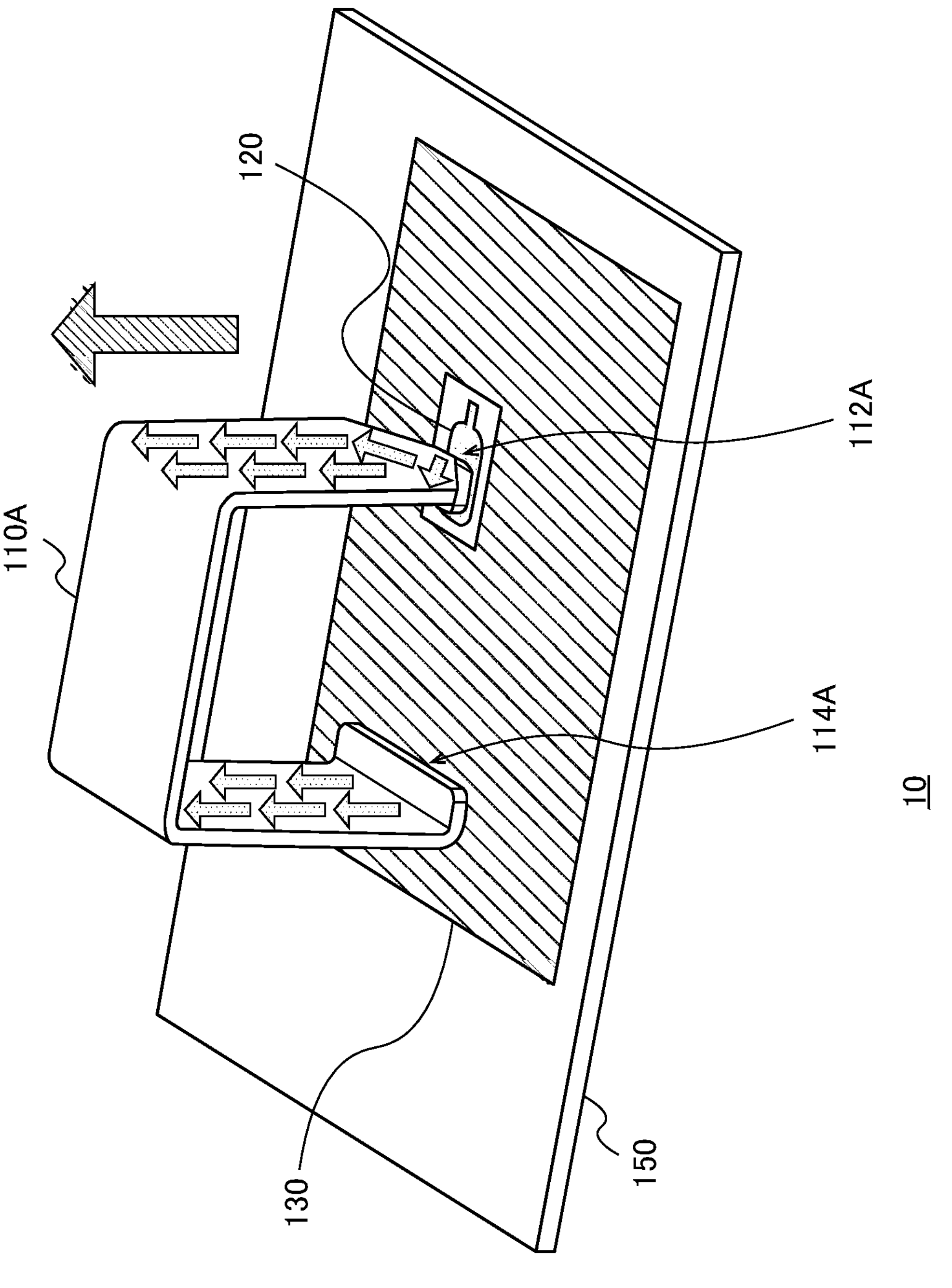
FIG. 7 is a diagram for explaining a distribution of a current flowing through the metal plate antenna 110 in accordance with its position on the substrate and a direction of a polarized wave in accordance with the distribution of the current according to the same embodiment.
Figure 8:
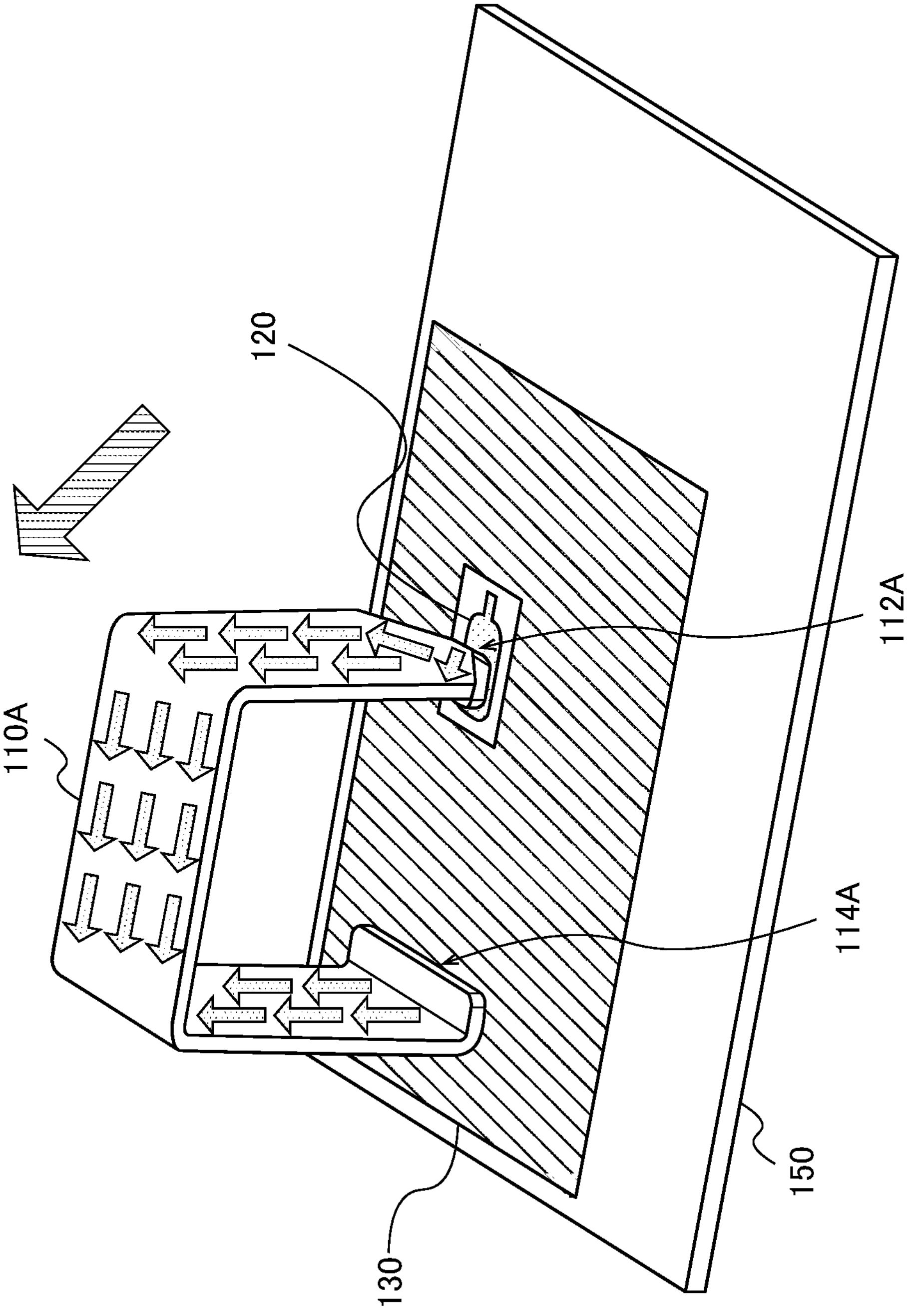
FIG. 8 is a diagram for explaining the distribution of the current flowing through the metal plate antenna 110 in accordance with the position on the substrate and the direction of the polarized wave in accordance with the distribution of the current according to the same embodiment.

FIGS. 7 and 8 are diagrams for explaining a distribution of a current flowing through the metal plate antenna 110 in accordance with its position on the substrate and a direction of a polarized wave in accordance with the distribution of the current.

Also, in FIGS. 7 and 8, the direction of the current is indicated by dot arrows, and the direction of the polarized wave is indicated by a hatched arrow.

FIG. 7 shows an example in a case in which the metal plate antenna 110A is disposed near a center of the substrate 150.

In this case, as shown in FIG. 7, almost no current flows parallel to the substrate 150 on an upper surface of the metal plate antenna 110A, and a current flowing perpendicularly to the substrate 150 becomes dominant.

As a result, the polarized wave associated with the metal plate antenna 110 becomes a vertically polarized wave, and the metal plate antenna 110 can receive only a vertically polarized wave.

On the other hand, FIG. 8 shows an example in a case in which the metal plate antenna 110A is disposed near a corner of the substrate 150.

In this case, unlike the case in which the metal plate antenna 110A is disposed near the center of the substrate 150, the current flowing parallel to the substrate 150 on the upper surface of the metal plate antenna 110A increases.

As a result, the polarized wave associated with the metal plate antenna 110 is greatly tilted from the vertical, and the metal plate antenna 110 can receive not only the vertical polarized wave but also a horizontally polarized wave.

Here, for example, a case in which the metal plate antenna 110 receives a polarized wave transmitted by a smartphone is assumed.

In general, since smartphones are often placed horizontally on a desk or placed in a pocket or bag in a near-vertical state, smartphones are highly likely to transmit both horizontal and vertical polarized waves.

For this reason, in the case of assuming reception of polarized waves from a device such as a smartphone, the antenna device 10 according to the present embodiment may be disposed near a corner of the substrate 150 as shown in FIG. 8.

Also, one of the factors that change a polarized wave of the metal plate antenna 110 in accordance with its position on the substrate 150 may be asymmetry of a current flowing through the GND 130. For this reason, the GND 130 according to the present embodiment may be formed in a pattern corresponding to the polarized wave received by the metal plate antenna 110.

<<1.4. Modified Examples>>

The basic description of the metal plate antenna 110 according to the present embodiment has been given above. Next, modified examples of the metal plate antenna 110 according to the present embodiment will be described.

First, a modified example of the bent portion 116 will be described. Although the case in which the bent portion 116 according to the present embodiment is bent toward the inside of the arch shape has been described above as a main example, the shape of the bent portion according to the present embodiment is not limited to such an example.

Figure 9:
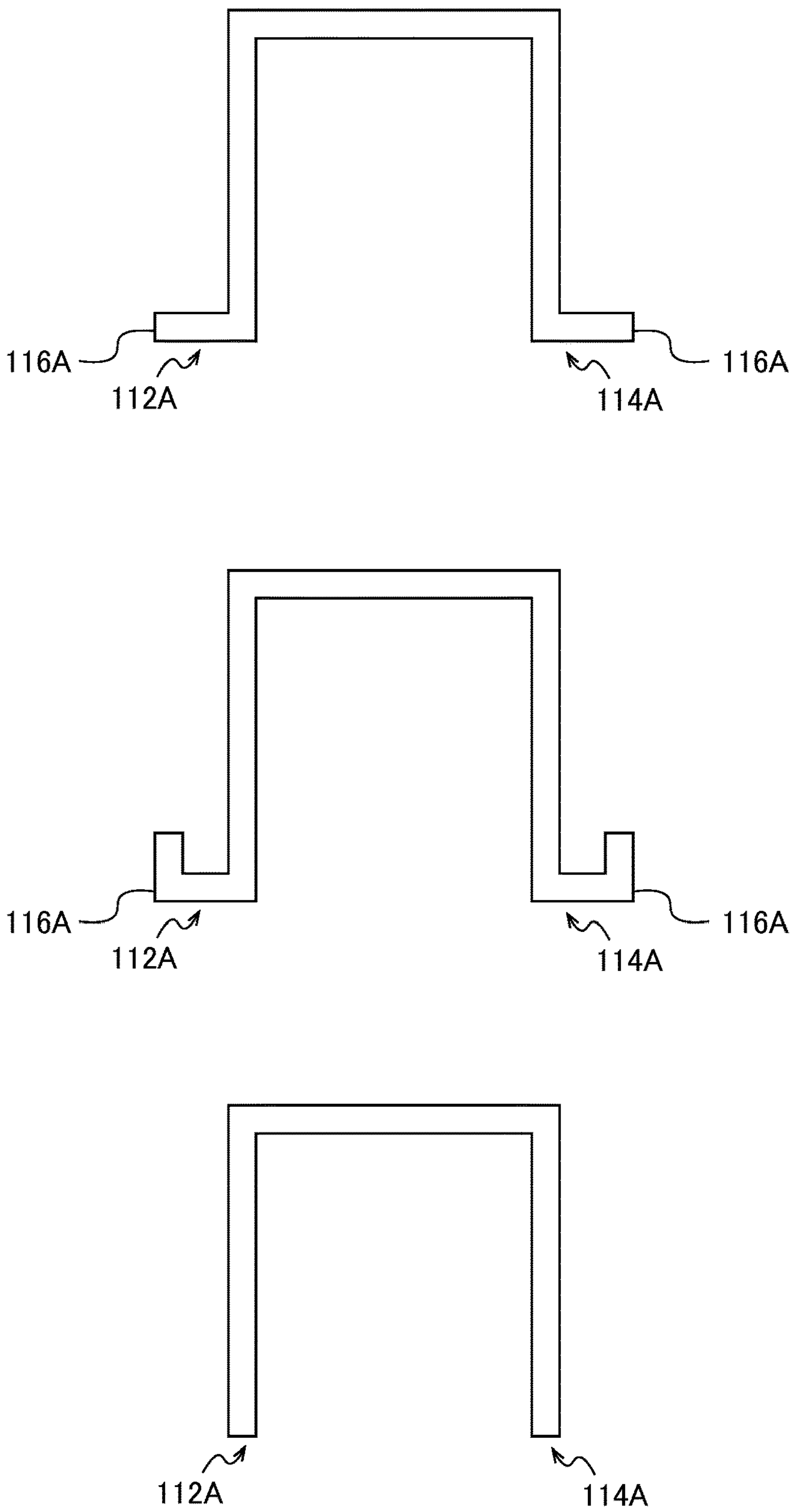
FIG. 9 is a schematic diagram for explaining a modified example of the bent portions 116 according to the same embodiment.

FIG. 9 is a schematic diagram for explaining a modified example of the bent portion 116 according to the present embodiment. Also, although FIG. 9 shows a modified example of the metal plate antenna 110A, a similar modified example can be applied to the metal plate antenna 110C.

As shown in the upper part of FIG. 9, the bent portion 116A according to the present embodiment may be bent toward the outside of the arch shape.

Further, as shown in the middle part of FIG. 9, the bent portion 116A according to the present embodiment may be bent toward the outside of the arch shape and then further bent in a substantially vertical direction.

In this case, there is an advantage that a fillet is easily formed in fixing with a conductive adhesive such as solder, and the formed fillet is easily confirmed.

On the other hand, the metal plate antenna 110A according to the present embodiment may not have the bent portion 116A, as shown in the lower part of FIG. 9.

In this case, the metal plate antenna 110A can also stand on its own on the substrate 150 by fixing it with a conductive adhesive such as solder.

In addition, in a case in which the metal plate antenna 110 has the bent portion 116, the metal plate antenna 110 may have opening portions 210 in the vicinity of a position immediately above the bent portion 116.

Figure 10:
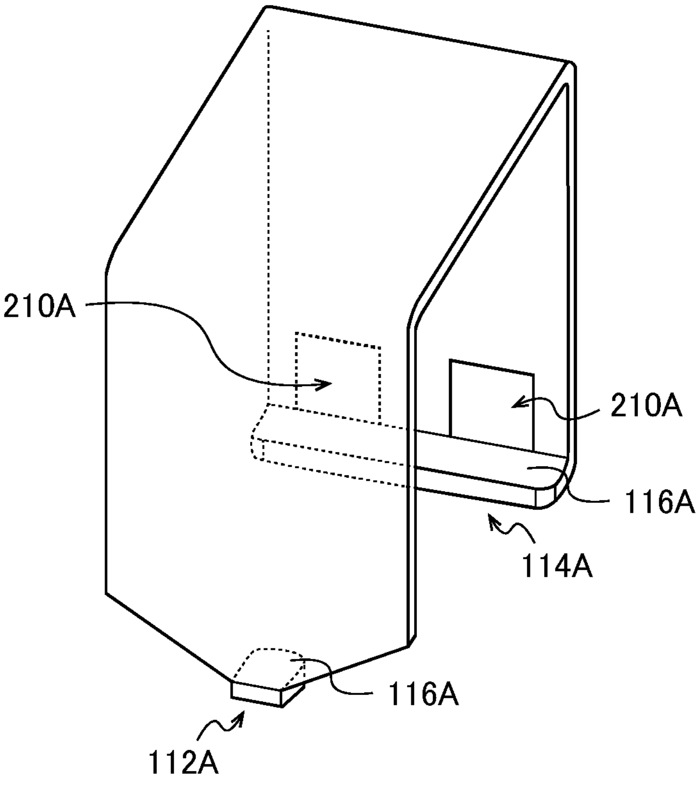
FIG. 10 is a diagram for explaining opening portions 210 formed in the vicinity immediately above the bent portion 116 according to the same embodiment.

FIG. 10 is a diagram for explaining the opening portions 210 formed in the vicinity of the portion immediately above the bent portion 116. Also, although FIG. 10 shows a modified example of the metal plate antenna 110A, a similar modified example can be applied to the metal plate antenna 110C.

Since the metal plate antenna 110A is formed using a metal material, it has high thermal conductivity. For this reason, at the time of fixing with a conductive adhesive such as solder, heat tends to escape upward from the bent portion 116A.

However, as shown in FIG. 10, in a case in which opening portions 210A are formed in the vicinity of the portion immediately above the bent portion 116A, it is possible to effectively prevent heat from escaping upward from the bent portion 116A, and to efficiently perform fixing with a conductive adhesive such as solder.

Next, modified examples related to securing the antenna length will be described.

In order to secure a target antenna length, the metal plate antenna 110 according to the present embodiment may have a structure for detouring the current, such as slits 220.

Figure 11:
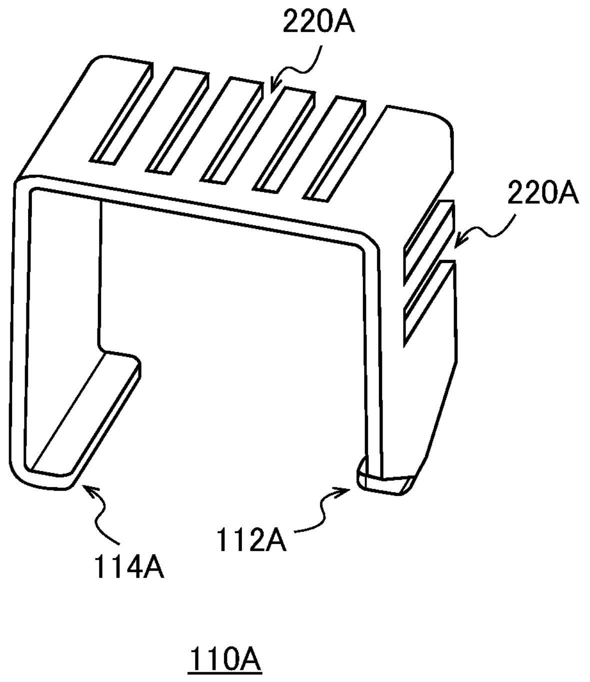
FIG. 11 is a diagram for explaining slits 220 according to the same embodiment.
Figure 12:
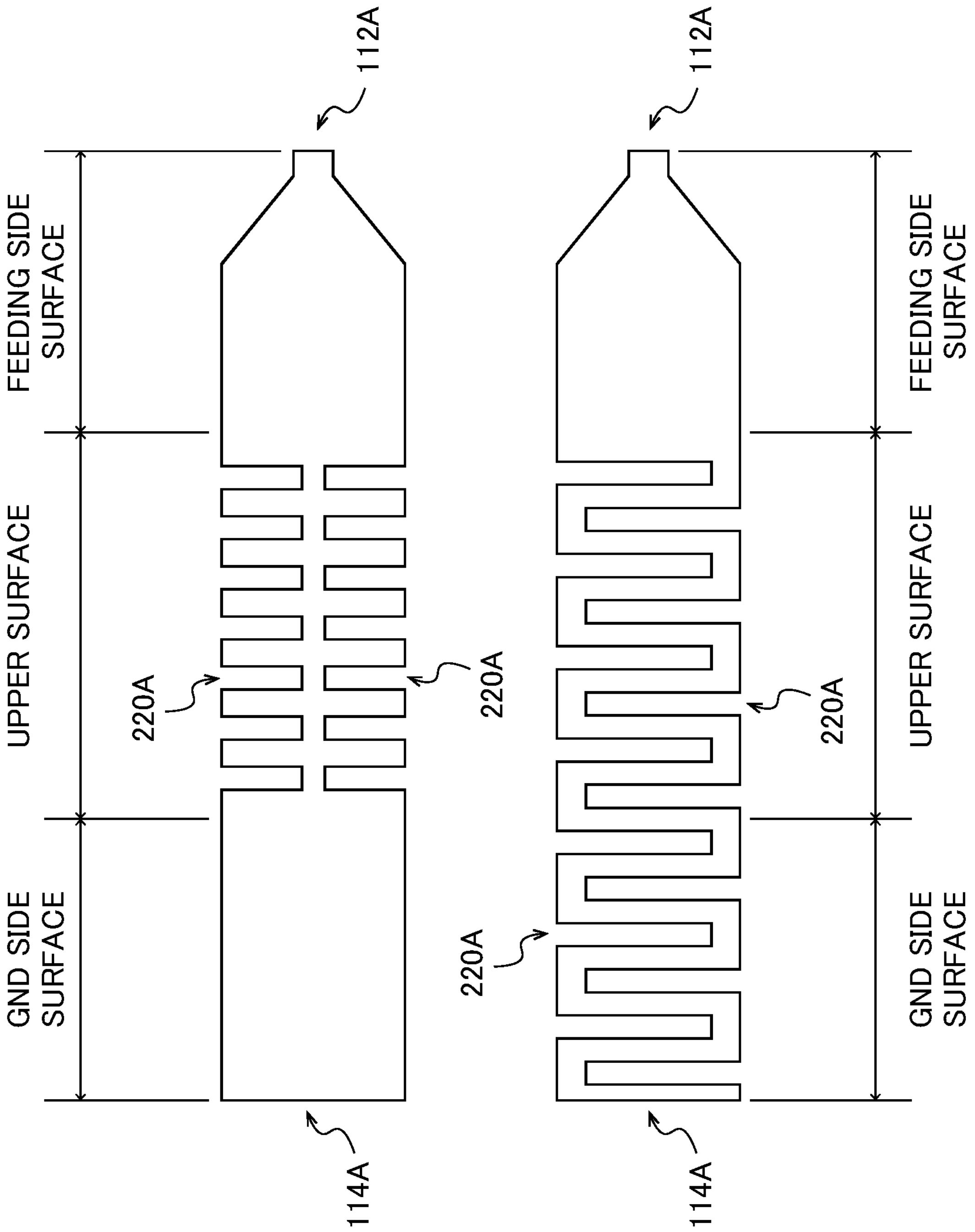
FIG. 12 is a diagram for explaining the slits 220 according to the same embodiment.

FIGS. 11 and 12 are diagrams for explaining the slits 220 according to the present embodiment. Also, although FIGS. 11 and 12 show modified examples of the metal plate antenna 110A, similar modified examples are applicable to the metal plate antennas 110B and 110C.

As shown in FIG. 11, the metal plate antenna 110A according to the present embodiment may have one or a plurality of slits 220A in the upper surface or a side surface (a side surface on the feeding point contact portion 112A side (a feeding side surface) or a side surface on the GND contact portion 114A side (a GND side surface)).

As shown in FIG. 11, in a case in which the metal plate antenna 110A has the slits 220A, the current flows to detour around the slits 220A, which makes it possible to secure a longer antenna length defined by the length between the feeding point contact portion 112A and the GND contact portion 114A.

Also, although FIG. 11 illustrates the case in which the plurality of slits 220A are formed in the same direction, a formation pattern of the slits 220A according to the present embodiment is not limited to this example.

The slits 220A according to the present embodiment may be formed in two opposing directions, for example, as shown in the upper and lower parts of FIG. 12.

Also, the structure for detouring the current formed in the metal plate antenna 110 is not limited to the slits 220. The structure may be the opening portions 210.

Figure 13:
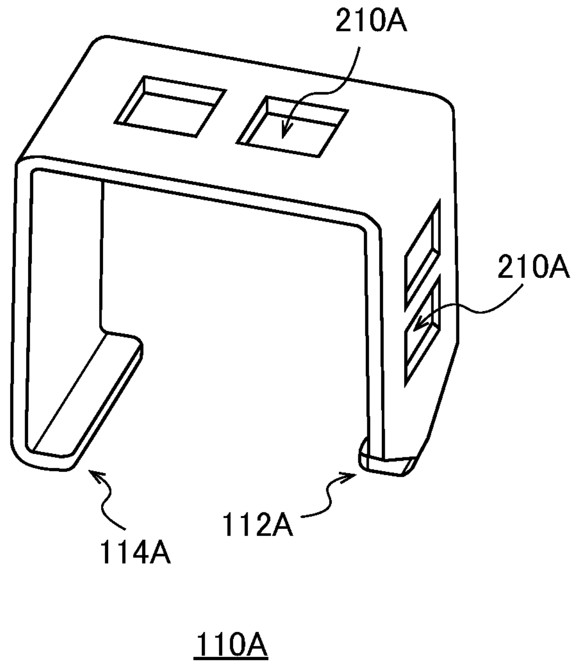
FIG. 13 is a diagram for explaining the opening portions 210 as a structure for detouring the current according to the same embodiment.

FIG. 13 is a diagram for explaining the opening portions 210 as a structure for detouring the current. Also, although FIG. 13 shows a modified example of the metal plate antenna 110A, a similar modified example is applicable to the metal plate antennas 110B and 110C.

As shown in FIG. 13, the metal plate antenna 110A according to the present embodiment may have one or a plurality of opening portions 210A in the upper surface or the side surface (the feeding side surface or the GND side surface).

As shown in FIG. 13, in a case in which the metal plate antenna 110A has the opening portions 210A, the current flows to detour around the opening portions 210A, which makes it possible to secure a longer antenna length defined by the length between the feeding point contact portion 112A and the GND contact portion 114A.

The slits 220 and the opening portions 210 as structures for detouring the current have been described above. Formation patterns of the slits 220 and the opening portions 210 may be appropriately designed in accordance with a desired antenna length, a size of the metal plate antenna 110, or the like.

Next, a modified example of the metal plate antenna 110 having two feeding point contact portions 112 will be described with reference to FIG. 14.

Figure 14:
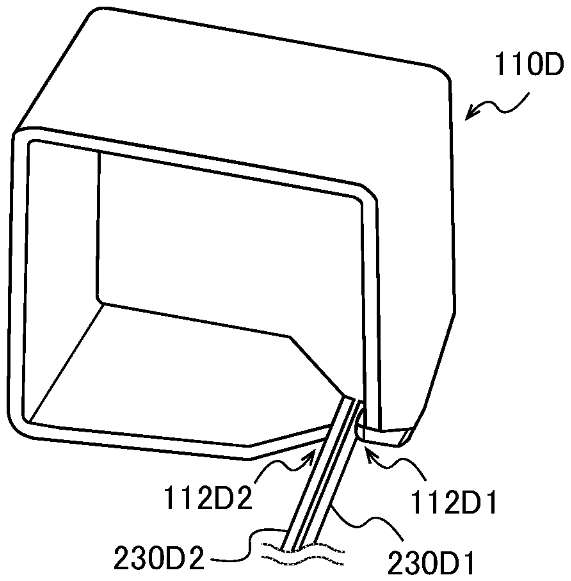
FIG. 14 is a diagram for explaining a modified example of the metal plate antenna 110 having two feeding point contact portions 112 according to the same embodiment.

A metal plate antenna 110D shown in FIG. 14 has two feeding point contact portions 112D1 and 112D2 while not having the GND contact portion 114.

Each of two feeding point contact portions 112D1 and 112D2 is connected to a feeding wiring 230D1(+) or a feeding wiring 230D2(−) provided on the substrate 150.

According to the above configuration, the metal plate antenna 110D can operate as a one-wavelength loop antenna without a minor image effect of the GND 130.

Figure 15:
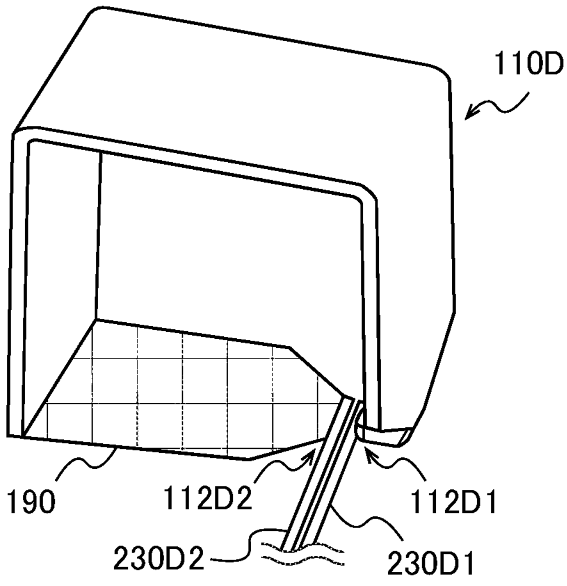
FIG. 15 is a diagram for explaining the metal plate antenna 110 electrically connected to a feeding wiring 230D via a metal foil pattern 190 according to the same embodiment.

Also, as shown in FIG. 15, the metal plate antenna 110D may be electrically connected to the feeding wiring 230D via a metal foil pattern 190 (indicated by a lattice pattern) formed on the substrate 150. Further, the metal foil pattern 190 may be made of copper foil or the like, for example. In this case, the metal plate antenna 110D can also operate as a one-wavelength loop antenna without the minor image effect of the GND 130.

In the above, the modified examples regarding securing the antenna length have been explained. Next, modified examples regarding a shape of the feeding side surface will be described.

Figure 16:
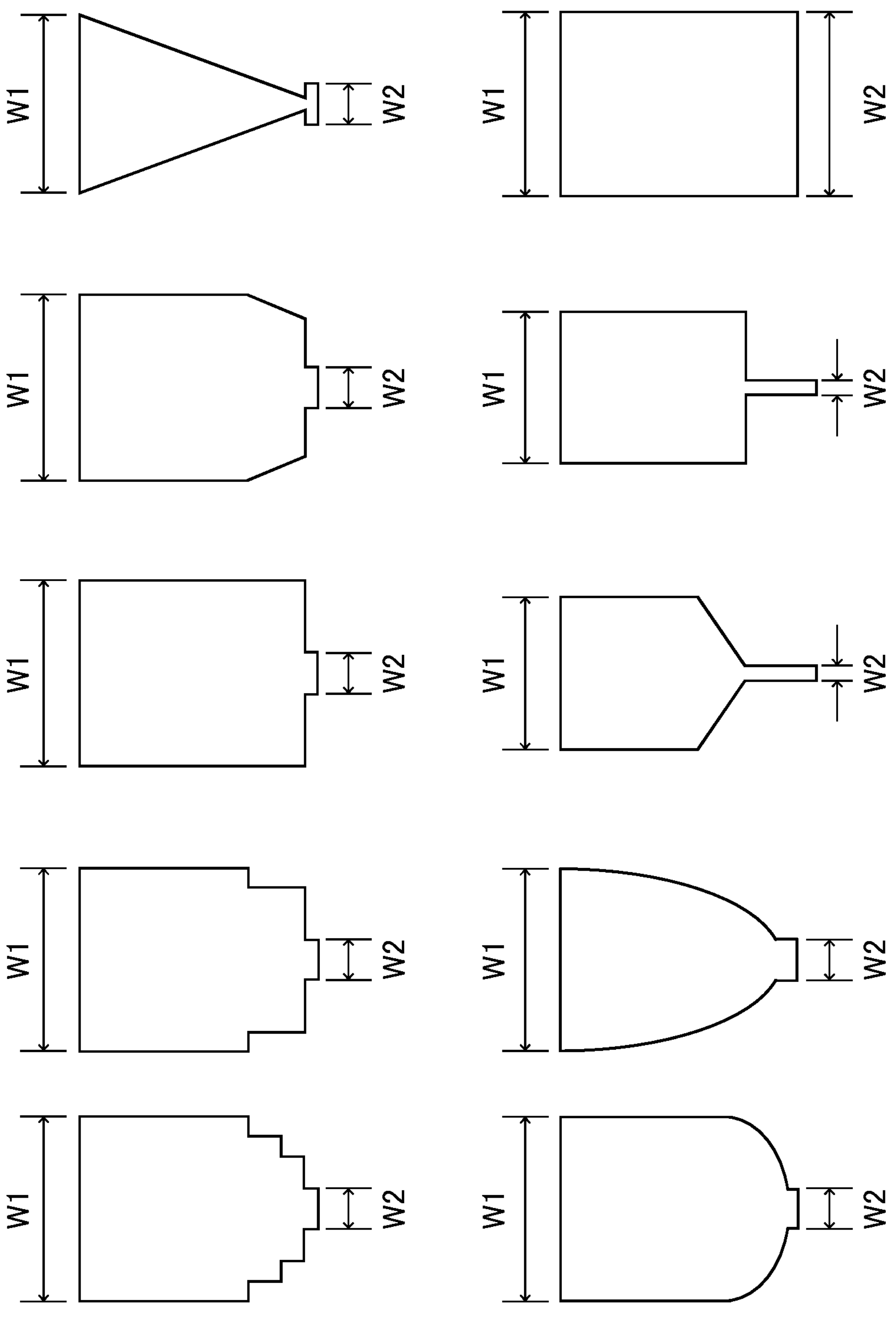
FIG. 16 is a diagram showing variation examples of a shape of a feeding side surface of the metal plate antenna 110 according to the same embodiment.

FIG. 16 is a diagram showing variation examples of the shape of the feeding side surface of the metal plate antenna 110 according to the present embodiment.

The feeding side surface of the metal plate antenna 110 according to the present embodiment may be formed such that a width W2 of a lower end thereof coming into contact with the feeding point 120 is narrower than a width W1 of an upper end thereof.

According to the above shape, the effect of facilitating impedance matching can be obtained.

However, in a case in which impedance can be matched by other means, the width W2 of the lower end may be approximately the same as the width W1 of the upper end, as illustrated in the lower right end of FIG. 16.

Next, a modified example in a case in which the metal plate antenna 110 according to the present embodiment has stubs 240 will be described.

Figure 17:
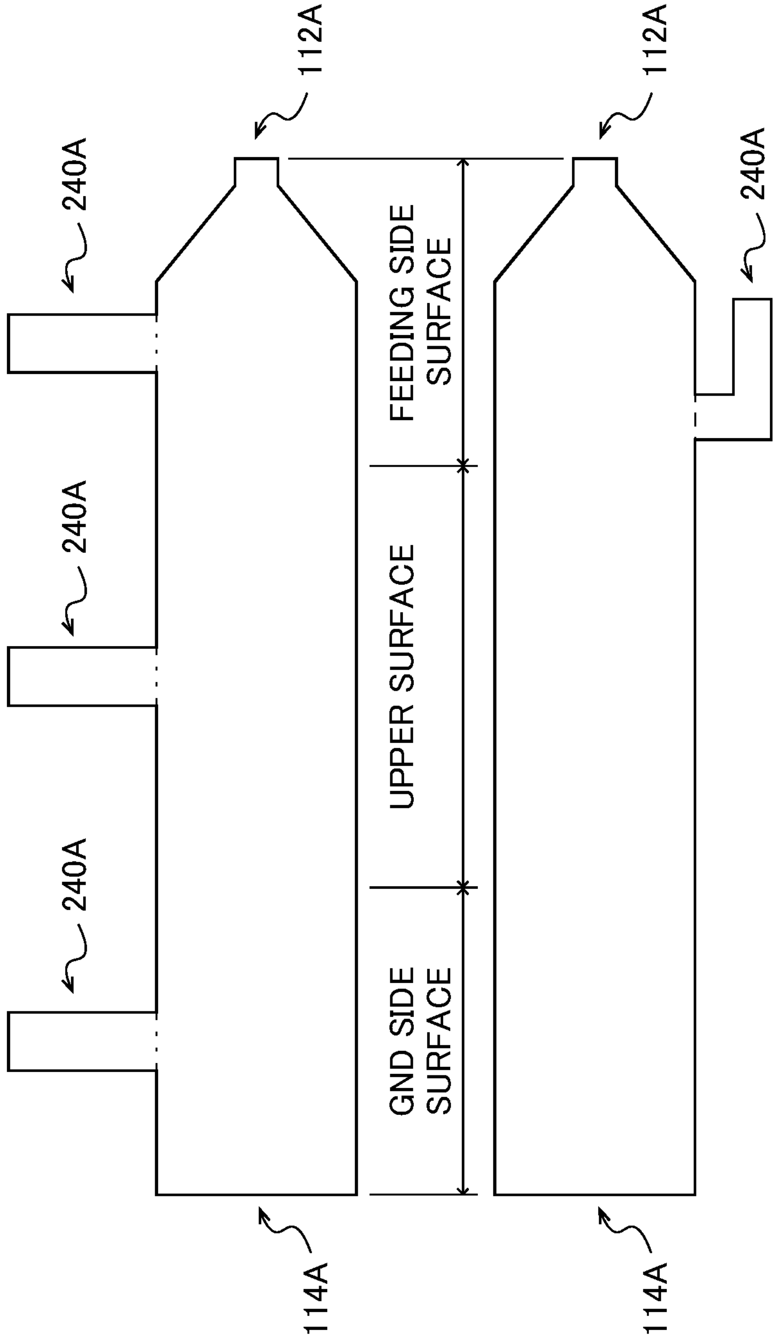
FIG. 17 is a diagram showing a formation example of stubs 240 according to the same embodiment.

FIG. 17 is a diagram showing a formation example of the stubs 240 according to the present embodiment. Also, although FIG. 17 shows a modified example of the metal plate antenna 110A, a similar modified example is applicable to the metal plate antennas 110B and 110C.

As shown in FIG. 17, the metal plate antenna 110 according to the present embodiment may have one or a plurality of stubs 240A on one or a plurality of surfaces of the GND side surface, the upper surface, and the feeding side surface.

As shown in the upper part of FIG. 17, the stubs 240A may be formed to extend in a direction substantially perpendicular to a direction connecting the feeding point contact portion 112A to the GND contact portion 114A.

According to the stubs 240A formed as described above, it is possible to further flow a current in a direction perpendicular to the current flow shown in FIGS. 7 and 8 to make the metal plate antenna 110A function as a circular polarized wave antenna.

Alternatively, as shown in the lower part of FIG. 17, the stub 240A may be formed to extend in the direction substantially perpendicular to the direction connecting the feeding point contact portion 112A to the GND contact portion 114A, and then further extend toward the feeding point contact portion 112A or the GND contact portion 114A.

Also, the stubs 240A may be bent, for example, at locations indicated by two-dot chain lines in FIG. 17.

According to the stubs 240 according to the present embodiment, it is possible to efficiently adjust the polarized wave and the antenna length.

Next, a mold structure according to the present embodiment will be described.

Figure 18:
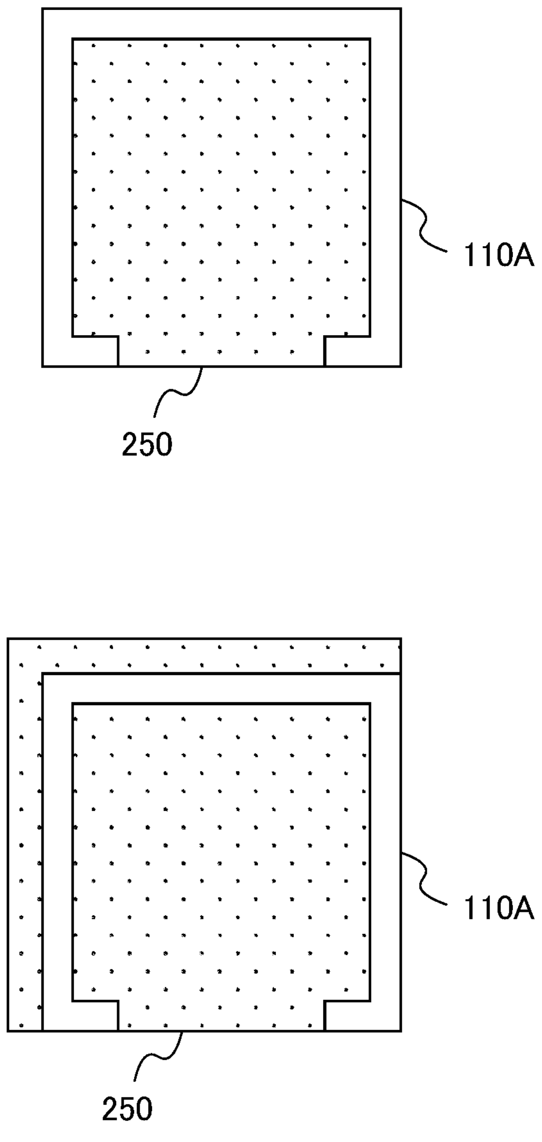
FIG. 18 is a diagram showing examples of a mold structure according to the same embodiment.

FIG. 18 is a diagram showing examples of the mold structure according to the present embodiment. Also, although FIG. 18 shows modified examples of the metal plate antenna 110A, similar modified examples can be applied to the metal plate antennas 110B and 110C.

As shown in the upper part of FIG. 18, an insulating material 250 may be filled inside the arch shape of the metal plate antenna 110A according to the present embodiment.

Alternatively, as shown in the lower part of FIG. 18, the metal plate antenna 110A according to the present embodiment may be covered with the insulating material 250 on the outside in addition to the inside of the arch shape.

According to such a mold structure using the insulating material 250, it is possible to effectively prevent a change in the shape of the metal plate antenna 110A.

Next, a modified example in which the metal plate antenna 110 according to the present embodiment has support portions 260 will be described.

The support portions 260 according to the present embodiment are configured to support the metal plate antenna 110 to be self-standing on the substrate 150.

Figure 19:
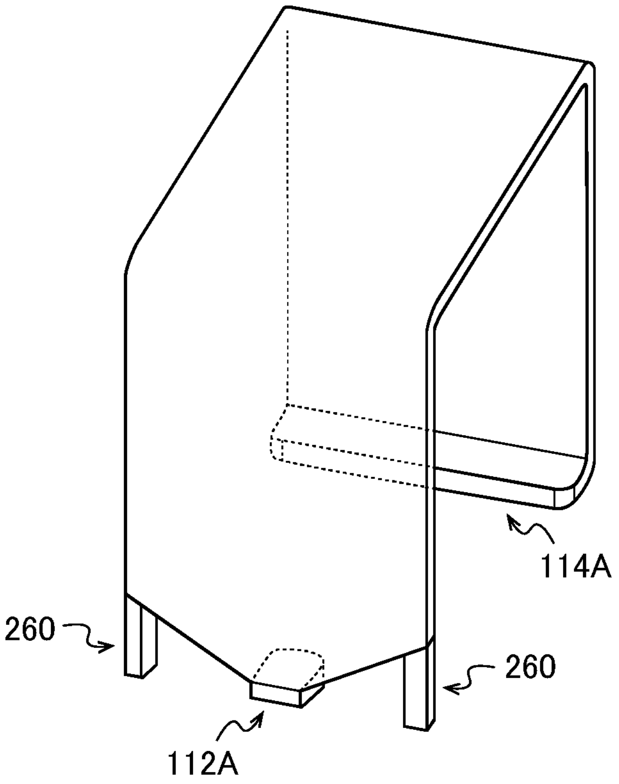
FIG. 19 is a diagram for explaining a shape example of support portions 260 according to the same embodiment.

FIG. 19 is a diagram for explaining a shape example of the support portions 260 according to the present embodiment. Also, although FIG. 19 shows a modified example of the metal plate antenna 110A, a similar modified example can be applied to the metal plate antennas 110B and 110C.

As shown in FIG. 19, the metal plate antenna 110A according to the present embodiment may have one or a plurality of support portions 260.

Further, FIG. 19 illustrates the case in which the support portions 260 are disposed on the feeding side surface, but the support portions 260 may be formed to connect the upper surface of the metal plate antenna 110A to the substrate 150.

According to the support portions 260 according to the present embodiment, the metal plate antenna 110A can more stably stand on its own on the substrate 150.

Next, a modified example of the metal plate according to the present embodiment will be described.

In the above, the case in which the metal plate antenna 110 according to the present embodiment is configured of one metal plate has been mainly described.

On the other hand, the metal plate antenna 110 according to the present embodiment may be configured of a plurality of metal plates.

Figure 20:
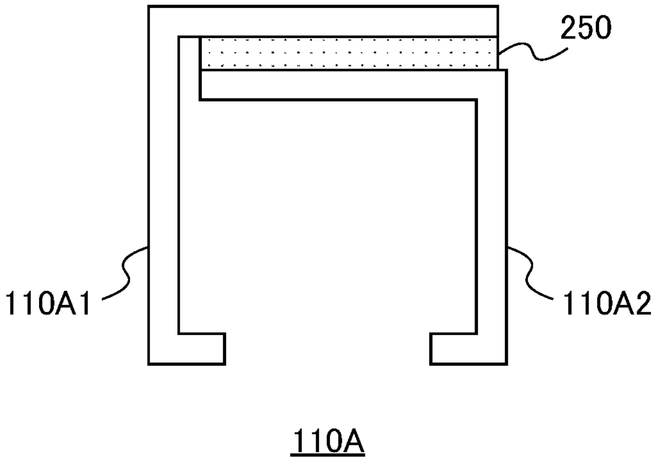
FIG. 20 is a diagram for explaining the metal plate antenna 110 formed from a plurality of metal plates according to the same embodiment.

FIG. 20 is a diagram for explaining the metal plate antenna 110 configured of a plurality of metal plates according to the present embodiment. Also, although FIG. 20 shows a modified example of the metal plate antenna 110A, a similar modified example can be applied to the metal plate antennas 110B and 110C.

As shown in FIG. 20, the metal plate antenna 110A according to the present embodiment may be configured of a metal plate 110A1 and a metal plate 110A2. Although a region between the metal plate 110A1 and the metal plate 110A2 is not DC-conducting, the region operates as a capacitor, and thus high frequency conduction is realized, and the function of the metal plate antenna 110A as an antenna is also realized.

Further, the region between the metal plates 110A1 and 110A2 may be filled with the insulating material 250, for example, as shown in FIG. 20.

In this case, it is possible to more stably maintain the shape (structure) of the metal plate antenna 110A.

<2. Supplement>

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

What is claimed is:

1. A metal plate antenna that has an arch shape and transmits and receives a radio signal based on a specified communication standard, the metal plate antenna comprising:

a feeding point contact portion configured to come into contact with a feeding point formed on a substrate at one end of the arch shape; and a ground (GND) contact portion configured to come into contact with a GND formed on the substrate at an other end of the arch shape, wherein an antenna length defined by a length between the feeding point contact portion and the GND contact portion is approximately ½ of a wavelength of the radio signal based on the specified communication standard, wherein each of the feeding point contact portion and the GND contact portion includes at least one pin portion inserted into a through hole formed in the substrate to prevent positional deviation of the metal plate antenna and to enable the metal plate antenna to stand independently, and the at least one pin portion of the GND contact portion is not fixed to the substrate.

2. The metal plate antenna according to claim 1, wherein at least one of the feeding point contact portion or the GND contact portion includes a bent portion formed by bending an end portion of the arch shape.

3. The metal plate antenna according to claim 1, wherein the feeding point contact portion and the GND contact portion include bent portions formed by bending end portions of the arch shape.

4. The metal plate antenna according to claim 1, wherein the feeding point contact portion includes a first bent portion formed by bending an end portion of the arch shape, and the GND contact portion includes a second bent portion and the at least one pin portion.

5. The metal plate antenna according to claim 1, wherein the specified communication standard includes ultra-wideband wireless communication.

6. The metal plate antenna according to claim 1, further comprising a slit or an opening portion in the arch shape.

7. The metal plate antenna according to claim 1, further comprising a stub in the arch shape.

8. The metal plate antenna according to claim 1, wherein a first width of a lower end of a side surface on the feeding point contact portion side of the arch shape is narrower than a second width of an upper end of the side surface.

9. The metal plate antenna according to claim 1, wherein an inside of the arch shape is filled with an insulating material.

10. The metal plate antenna according to claim 1, further comprising a support portion configured to support the metal plate antenna to be self-standing on the substrate.

11. The metal plate antenna according to claim 1, wherein the arch shape is formed by a plurality of metal plates.

12. An antenna device, comprising:

a substrate;

a feeding point formed on the substrate;

a ground (GND) formed on the substrate;

a high frequency integrated circuit (IC) disposed on the substrate;

a notch filter formed on the substrate and attenuating a signal in a specified frequency band; and a metal plate antenna that has an arch shape, is disposed on the substrate, and transmits and receives a radio signal based on a specified communication standard, wherein connection and disconnection between a transmission line connecting the high frequency IC to the feeding point and the notch filter is switchable by an element, the metal plate antenna includes:

a feeding point contact portion configured to come into contact with the feeding point formed on the substrate at one end of the arch shape; and a GND contact portion configured to come into contact with the GND formed on the substrate at an other end of the arch shape, an antenna length defined by a length between the feeding point contact portion and the GND contact portion is approximately ½ of a wavelength of the radio signal based on the specified communication standard, wherein each of the feeding point contact portion and the GND contact portion includes at least one pin portion inserted into a through hole formed in the substrate to prevent positional deviation of the metal plate antenna and to enable the metal plate antenna to stand independently, and the at least one pin portion of the GND contact portion is not fixed to the substrate.

13. The antenna device according to claim 12, wherein the connection and disconnection between the transmission line connecting the high frequency IC to the feeding point and the notch filter is switchable by a presence or an absence of a chip element.

14. The antenna device according to claim 13, further comprising a switch element configured to switch the connection and disconnection between the transmission line connecting the high frequency IC to the feeding point and the notch filter.

15. An antenna device, comprising:

a substrate;

a feeding point formed on the substrate;

a ground (GND) formed on the substrate; and a metal plate antenna that has an arch shape, is disposed on the substrate, and transmits and receives a radio signal based on a specified communication standard, wherein the metal plate antenna includes:

a feeding point contact portion configured to come into contact with the feeding point formed on the substrate at one end of the arch shape; and a GND contact portion configured to come into contact with the GND formed on the substrate at an other end of the arch shape, an antenna length defined by a length between the feeding point contact portion and the GND contact portion is approximately ½ of a wavelength of the radio signal based on the specified communication standard, the metal plate antenna is disposed at a position on the substrate in accordance with a received polarized wave, wherein each of the feeding point contact portion and the GND contact portion includes at least one pin portion inserted into a through hole formed in the substrate to prevent positional deviation of the metal plate antenna and to enable the metal plate antenna to stand independently, and the at least one pin portion of the GND contact portion is not fixed to the substrate.

16. The antenna device according to claim 15, wherein the metal plate antenna is disposed near a corner of the substrate.

* * * * *